Sept. 10, 1935.   J. L. SAULS   2,013,993
PNEUMATIC VIBRATION DETECTOR
Filed Feb. 21, 1931   2 Sheets-Sheet 1

INVENTOR
JAMES L. SAULS
BY his ATTORNEY

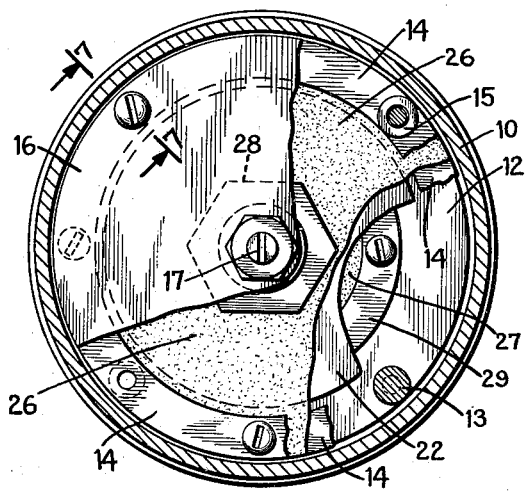
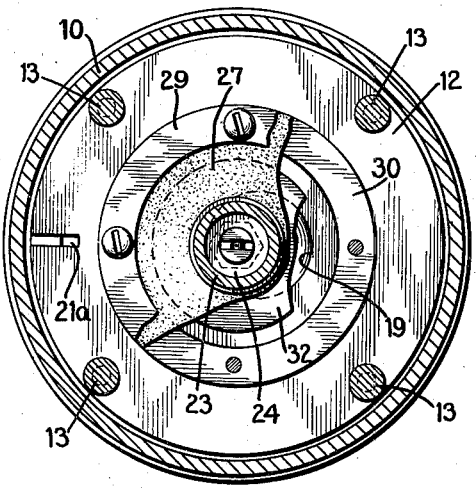
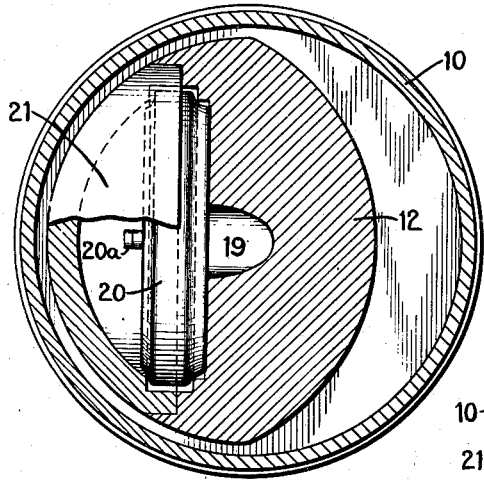
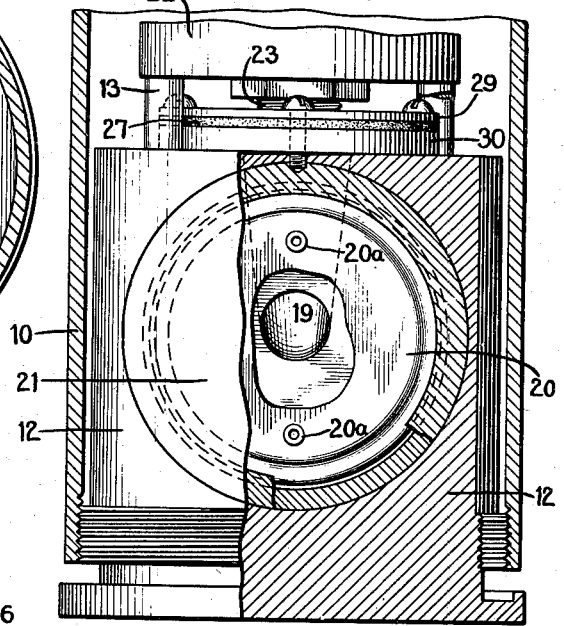
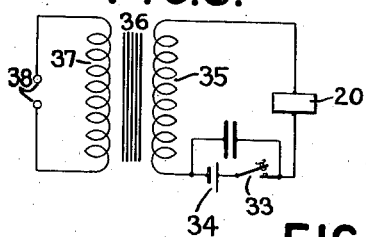
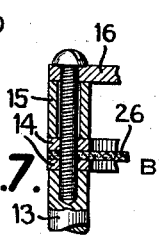

Patented Sept. 10, 1935

2,013,993

UNITED STATES PATENT OFFICE 2,013,993

PNEUMATIC VIBRATION DETECTOR

James L. Sauls, Angola, Ind., assignor to The Texas Company, New York, N. Y., a corporation of Delaware Application February 21, 1931, Serial No. 517,465

2 Claims. (Cl. 177—352)

My invention relates to vibration detectors, more particularly to a pneumatic device for detecting sound or similar compressional waves coming through the air or through some solid medium such as the earth. The principal object of the invention is the provision of a vibration detecting device which will be responsive to compressional waves of a definite frequency or to waves the frequencies of which lie between predetermined limits.

Heretofore the majority of detectors designed for the above purpose have involved some sort of magneto electric construction, i. e., one in which a variation of magnetic flux cutting across a coil or similar conductor is made to induce a current therein in response to a vibration. Detectors of this type have involved a relatively complicated construction and have been difficult to maintain in adjustment. Furthermore the currents induced by virtue of the sound or other compressional waves striking the detector have frequently been very feeble and have necessitated the use of cumbersome and expensive amplifying apparatus before being transmitted to a suitable indicating or recording device, such as a galvanometer or oscillograph.

Further objects of my invention are the provision of a vibration detector which will consist of relatively few parts, which will not depend for efficient operation on any critical adjustment of its elements, and which can be connected directly to an oscillograph or other recording instrument without necessitating the use of amplifying apparatus.

In carrying out my invention I have provided two relatively movable elements, one of which is responsive to sound or compressional wave vibrations, i. e., which will vibrate in synchronism with and in proportion to compressional waves traveling through the medium in which the element is located, and the other of which, termed the inertia element, will remain stationary during the reception of such waves. An enclosed air chamber is formed between these two elements and as the volume of this chamber fluctuates in accordance with the relative movement between the two elements, a variable air pressure will be exerted on the diaphragm of a microphone connected in turn to a suitable indicating or recording instrument. The latter instrument will thus indicate the amplitude and duration of the compressional waves.

For a better understanding of my invention reference may be had to the accompanying description and drawings, in which:

Fig. 2 is a sectional plan view taken approximately on line 2—2 of Fig. 1.

Fig. 3 is a sectional view taken on line 3—3 of Fig. 1.

Fig. 4 is a sectional view taken on line 4—4 of Fig. 1.

Fig. 5 is a side sectional elevation of the microphone and associated parts, taken from the left in Fig. 1.

Fig. 6 is a schematic wiring diagram showing the device connected to an oscillograph or the like, while Fig. 7 is a detail sectional view taken on line 7—7 of Fig. 2.

Figure 1:
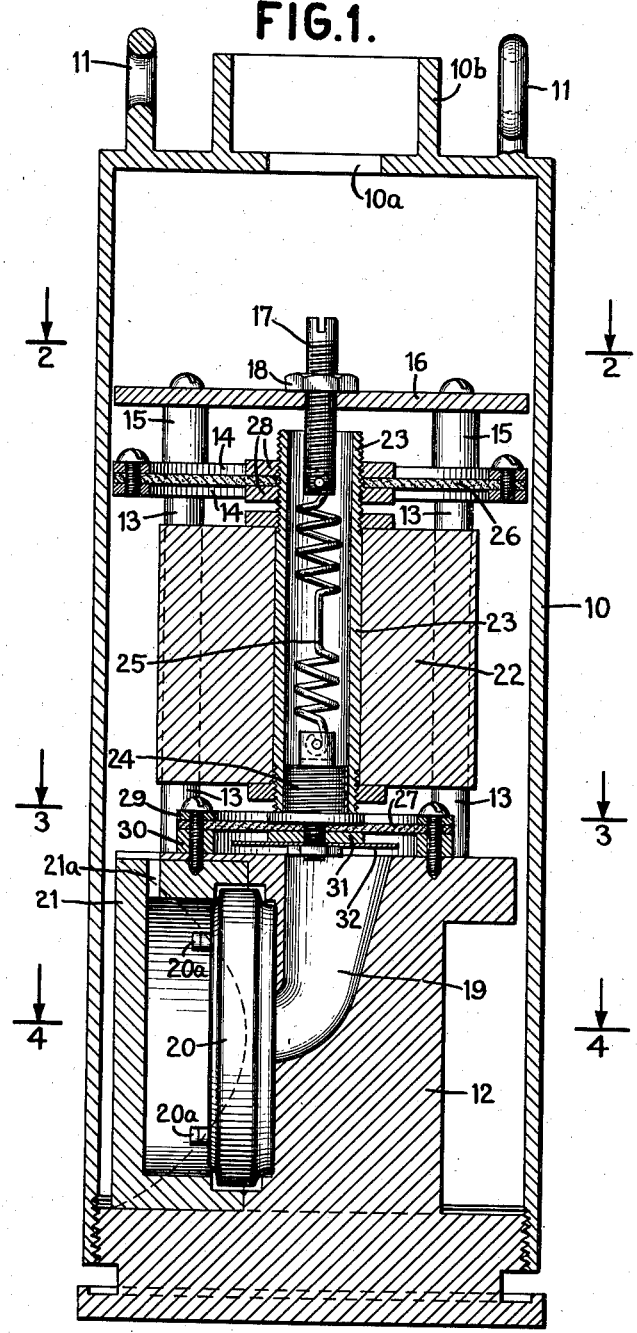
Fig. 1 is a side elevation in section of a preferred embodiment of my invention.

Referring to the drawings, I have shown my detector as housed in a casing 10, provided with suitable eyelets 11, to be used in lowering or raising the device. While it is intended that the detector be used in the determining of sound or other compressional waves passing through the earth, the device may also be used to advantage in detecting waves of this type passing through water. In this latter case the device will merely be suspended in the water by means of suitable cables attached to the eyelets 11. The top of the casing 10 is provided with an opening 10a and an upstanding flange 10b which may be filled with suitable packing to render the casing air and watertight. A tool may be inserted through the opening 10a to adjust the screw 17, the purpose of which will be described hereinafter.

A wave responsive element 12, preferably formed as a solid block of metal of relatively light weight, such as aluminum, is adapted for threaded engagement with the lower end of the casing 10, and to the upper end of this wave responsive element is secured a plurality of supporting posts 13, which, in turn, support at their upper ends a pair of clamping rings 14, 14 and a second set of shorter posts or legs 15. A disc 16 is secured to the upper ends of the legs 15, and has threaded through its center an adjusting screw 17, with a lock nut 18, the purpose of which will be later described. The wave responsive element 12 has formed therein a funnel-shaped chamber 19, the larger opening of which is at the top of the wave responsive element. A carbon button or microphone 20 is adapted to be held in engagement with the side of the wave responsive element 12 by means of a supporting member 21 and is so arranged that its diaphragm (not shown) will register with and close the lower and smaller opening of the chamber 19. The microphone 20 is provided with binding posts 20a to which electrical leads, not shown, may be connected, these leads then passing outwardly through the opening 10a. A vent opening 21a is provided in the member 21 so that the back of the microphone 20 will be maintained at substantially atmospheric pressure.

In accordance with my invention, I have provided means for varying the air pressure in the chamber 19 in response to vibration of the wave responsive element 12 caused by compressional waves passing through the medium in which the casing 10 is inserted. To this end I have provided an inertia element which comprises a mass or weight member 22 and means for yieldably supporting this weight member so that it will remain substantially stationary while the wave responsive element 12 is being vibrated in a vertical direction. The weight member 22 is mounted on a supporting tube 23 which is provided at its lower end with a threaded plug 24. A helical spring 25 is attached at its lower end to the threaded plug 24 and at its upper end to the adjusting screw 17. It is contemplated that several of the members 22 will be provided, the members having slightly different weights, and if it is desired to alter the effective inertia of the inertia element, it is merely necessary to remove the member 22 from the supporting tube 23 and replace it with another member having the desired mass or weight. It will be observed that one-half of the spring 25 is wound in one direction, while the other half is wound in the other direction, thus eliminating a tendency for the spring to twist as it is stretched or compressed.

In order to maintain the inertia element in a mid-position, a pair of flexible leather diaphragms 26 and 27 are provided. The outer edge of the diaphragm 26 is securely clamped between the rings 14 while the mid-portion of the diaphragm is secured between a second smaller pair of rings or nuts 28, which are threaded on the supporting tube 23. Likewise, the lower diaphragm 27 is clamped at its outer edge between two rings 29 and 30 which are suitably secured to the upper portion of the wave responsive element 12 and supporting member 21 and which surround the upper opening of the chamber 19. The mid-portion of the lower diaphragm 27 is secured to the threaded plug 24 by means of a suitable bolt and washer 31, and it will thus be observed that the upper and lower ends of the inertia element will be maintained in mid-position by means of the diaphragms 26 and 27 and at the same time the inertia element will be free to move slightly in a vertical direction, relatively to the wave responsive element 12. It will also be observed that the ring 30 and the diaphragm 27 form the upper walls of the air-chamber 19 and as a result when the wave responsive element 12 is vibrated or moved relatively to the weight member 22 of the inertia element, the diaphragm 27 will be flexed and the volume and pressure of the air in the chamber 19 will fluctuate in accordance with the vibrations of the wave responsive element. In order to provide critical damping for these fluctuations, I have provided a metal damping disc 32 secured to the threaded plug 24 directly below the washer 31.

The fluctuations in air pressure will be transmitted to the diaphragm of the microphone 20 and it is contemplated that the microphone will be connected to an indicating or recording instrument as shown diagrammatically in Fig. 6. In this figure the microphone 20 is shown connected in series with a key or switch 33, a dry cell or other suitable source of electrical supply 34, and the primary 35 of a transformer 36. The secondary 37 of the transformer may be connected directly to the terminals 38 of the indicating or recording instrument which may be a galvanometer or an oscillograph.

To summarize the operation of my detector, any movement of the base or wave responsive element 12 will cause a corresponding movement of the lower leather diaphragm 27, which will in turn cause an increase or decrease in the volume of the chamber 19. Since by Boyle's law the volume of a gas varies inversely as the pressure at constant temperatures, any change in the volume of the air chamber 19 will cause a change in the pressure of air on the diaphragm of the microphone 20. This in turn will cause a change in the electrical resistance of the carbon button or microphone 20, which may be connected in a suitable electrical circuit such as that shown in Fig. 6. Since the amount of current flow in an electric circuit is inversely proportional to the resistance in that circuit, any variation of the resistance of the microphone 20 due to earth or other vibrations causing a change of pressure in the air chamber 19, will cause a change or variation of the current flow in the galvanometer or oscillograph in synchronism with the earth movement.

It is to be noted that my detector is so designed that the sole function of the mass or weight member 22 is to govern the natural period of the device, that is, the frequency of the vibrations to which the detector will best respond. When the element 12 moves in response to a ground vibration, air is forced against the damping disc 32 and this disc, being firmly attached to the inertia element 22, tends to oppose the movement of the air and thus the motion of the wave responsive element 12. The disc 32 thus serves to dampen the fluctuations and bring the inertia element to rest before another group of ground vibrations reach the detector.

It will be observed that the position of the mass 22 with respect to the other parts of the instrument, from day to day, does not affect the sensitivity and that no trouble due to expansion or contraction of the spring 25 by temperature changes will result. There are no close, delicate or precise adjustments to be made, the only adjustment necessary being that which would be caused by the natural fatigue of the spring 25, which is encountered in practically all types of electrical detectors. In addition it will be seen that my detector works on the displacement principle, the acceleration or the speed with which the wave responsive element 12 moves, having no effect on the change of volume in the air chamber for any given distance of movement. Since the microphone 20 may be connected directly to a galvanometer or other indicating or recording instrument, the necessity for expensive and cumbersome electrical amplifying apparatus will be obviated.

Obviously many modifications and variations of the invention, as hereinbefore set forth, may be made without departing from the spirit and scope thereof, and therefore only such limitations should be imposed as are indicated in the appended claims.

I claim:

1. In a vibration detector, a wave-responsive element, an inertia element, said inertia element comprising a tubular supporting member and a plurality of annular members of different weights adapted to be interchangeably received by and mounted upon said supporting member whereby the effective inertia of said inertia element may be altered, a pair of flexible diaphragms mounted between said tubular supporting member and said wave-responsive element, one of said diaphragms forming with said wave responsive element an air chamber, means for resiliently suspending said inertia element from said wave responsive element, said means including a helical spring located within said tubular supporting member and attached at one end to said tubular supporting member and at the other end to said wave responsive element, and a microphone communicating with said chamber and actuable in accordance with fluctuations in air pressure produced by relative movement between said wave-responsive element and said last mentioned diaphragm.

2. In a vibration detector, a casing, an element secured to and within said casing and responsive to compressional wave vibrations; an inertia element resiliently supported within said casing so as to be capable of slight relative movement with respect to said vibration responsive element and said casing, said vibration responsive element having an air chamber formed therein, said air chamber having an opening at one side of said vibration responsive element, a flexible diaphragm secured around its periphery to said first mentioned element so as to cover said chamber opening, a connection between said inertia element and said diaphragm, the arrangement being such that relative movement between said vibration responsive element and said inertia element will effect variations in the air pressure in said chamber, and a microphone mounted in said vibration responsive element and communicating with one end of said chamber so as to be actuated by said variations of air pressure in said chamber.

JAMES L. SAULS.